US008198582B2

(12) United States Patent
Raptakis et al.

(10) Patent No.: US 8,198,582 B2
(45) Date of Patent: Jun. 12, 2012

(54) METHOD AND APPARATUS FOR THERMALIZATION OF IONS

(75) Inventors: Emmanuel Raptakis, Athens (GR); Dimitris Papanastasiou, Athens (GR); Andrew Bowdler, Walsall Staffordshire (GB)

(73) Assignee: Kratos Analytical Limited, Manchester Greater (GB)

( * ) Notice: Subject to any disclaimer, the term of this patent is extended or adjusted under 35 U.S.C. 154(b) by 523 days.

(21) Appl. No.: 12/308,456

(22) PCT Filed: Jun. 14, 2007

(86) PCT No.: PCT/GB2007/002214

§ 371 (c)(1),
(2), (4) Date: Dec. 16, 2008

(87) PCT Pub. No.: WO2007/144627

PCT Pub. Date: Dec. 21, 2007

(65) Prior Publication Data

US 2010/0270465 A1 Oct. 28, 2010

(30) Foreign Application Priority Data

Jun. 16, 2006 (GB) .................................. 0612001.8

(51) Int. Cl.
*B01D 59/44* (2006.01)
*H01J 49/00* (2006.01)

(52) U.S. Cl. ........ 250/282; 250/281; 250/283; 250/286; 250/287; 250/288; 250/292; 250/293

(58) Field of Classification Search .......... 250/281–283, 250/286–288, 292, 293
See application file for complete search history.

(56) References Cited

U.S. PATENT DOCUMENTS

| | | | | |
|---|---|---|---|---|
| 6,545,268 | B1 | 4/2003 | Verentchikov | |
| 2003/0141447 | A1 | 7/2003 | Verentchikov et al. | |
| 2004/0026612 | A1* | 2/2004 | Bateman et al. | 250/281 |
| 2004/0079880 | A1* | 4/2004 | Bateman et al. | 250/288 |
| 2004/0089799 | A1 | 5/2004 | Kawato et al. | |
| 2005/0189487 | A1* | 9/2005 | Iwamoto | 250/288 |

OTHER PUBLICATIONS

Papanastasiou, D., Balgacem, O., Sudakov, M., Raptakis, E., "IOn thermalization using pressure transients in a quadrupole ion trap coupled to a vacuum matrix-assisted laser desorption ionization source and a reflectron time-of-flight mass analyzer" in Reveiw if Scientific Instruments vol. 79, 055103, 2008.*
GB Office Action application No. GB0612001.8 dated Nov. 18, 2010.
Papanastasiou, D., et al., "Ion Thermalization Using Pressure Transients in a Quadrupole Ion Trap Coupled to a Vacuum Matrix-Assisted Laser Desorption Ionization Source and a Reflectron Time-of-Flight Mass Analyzer", Review of Scientific Instruments 79, 055103, May 14, 2008, pp. 1-12.
Papanastasiou et al., "Dynamic Pressure Measurements During Pulsed Gas Injection in a Quadrupole Ion Trap", Vacuum Pergamon Press, GB, vol. 81, No. 4, Nov. 6, 2006, pp. 446-452.

* cited by examiner

*Primary Examiner* — Jack Berman
*Assistant Examiner* — Meenakshi Sahu
(74) *Attorney, Agent, or Firm* — Squire Sanders (US) LLP

(57) ABSTRACT

A method of pulsing gas in a quadrupole ion trap to reduce excess internal energy of ions formed externally to the trap at high-vacuum conditions by laser desoprtion is disclosed. With pulsed gas introduction, pressures greater than those under which traps are normally operated can be achieved over a few milliseconds. Under these elevated pressure transients, the process of translational cooling is accelerated and ions undergo thermalized collisions before dissociation occurs. Minimization of uncontrolled fragmentation (thermalization) and enhanced sensitivity are observed at pressures exceeding a threshold of about 1 mTorr.

36 Claims, 9 Drawing Sheets

METHOD AND APPARATUS FOR THERMALIZATION OF IONS

The present invention is concerned with the thermalization of ions produced in mass spectrometers and hybrid mass spectrometers. In particular, the present invention relates to methods and apparatus for reducing uncontrolled fragmentation of externally injected thermally labile molecular ions in quadrupole ion traps (QIT).

The development of soft laser desorption/ionization techniques for analyzing macromolecular ions has established mass spectrometry as a indispensable tool in life sciences. In particular, the matrix assisted laser desorption ionization (MALDI) technique has been continuously evolving, providing greater sensitivity and higher resolving power systems where gas phase ions can be efficiently controlled and studied.

The inherent pulsed nature of the MALDI process and the requirement for high mass measurements has facilitated the development of time-of-flight mass spectrometry (TOF MS). Subsequently, quadrupole ion traps have been used for selectively isolating and dissociating ions—ion traps can perform $MS^n$ experiments while $MS^n$ in TOF MS is impractical. Thus, QIT MS enables ions to be stored and processed prior to mass analysis.

In both TOF MS and QIT MS, ions produced from the ion source can have excess internal energy (in the form of vibrational and rotational energy) and as a result the ions are metastable and can fragment prior to detection. Metastable decay is undesirable because it is difficult or even impossible to analyse complex mixtures and identify the original precursor ions for each of the detected species. In particular, in the case of MALDI ion sources coupled with a TOF mass analyser, metastable decay of the desorbed entities is known to result in increased background-to-noise levels, reduced sensitivity and poor resolving power.

In a similar but distinct phenomenon, external injection of ions from a vacuum MALDI ion source in a QIT MS is known to lead to uncontrolled fragmentation of ions in the ion trap. Uncontrolled fragmentation may occur when an ion collides with a buffer gas species in the ion trap. The collision itself can impart excess internal energy to an already excited ion, causing it to fragment.

Buffer gas is present in the ion trap (typically at about $10^{-5}$-$10^{-4}$ mbar) because it can lower the kinetic energy of the ions, thereby improving trapping efficiency. So, although ion traps have the advantage of performing $MS^n$ experiments, external injection of ions into the trap is known to lead to uncontrolled fragmentation within the trap.

Whilst fragmentation can in some situations be a useful process for discovering more information about the structure of an ion (e.g. dipole excitation waveforms can be used in collision induced dissociation (CID) experiments to increase ion kinetic energy and hence the energy of collisions with buffer gas), uncontrolled fragmentation (also known as metastable fragmentation) is generally regarded as a drawback of the MALDI technique.

One approach to address the problem of metastable decay in TOF systems and uncontrolled fragmentation when the MALDI source is coupled to trapping devices has been to carry out production of ions at atmospheric pressure or "intermediate" pressure (typically $10^{-2}$ mbar to 1 mbar). So called atmospheric pressure MALDI (AP-MALDI) experiments have been shown to reduce fragmentation, due to fast thermalization as a result of collisions with the buffer gas molecules in the source (i.e. translational energy cooling and relaxation (cooling) of the internal (vibrational) energy of the ions in the source).

The term "thermalization" as used herein means lowering of the vibrational (internal) energy of the ions, preferably by lowering the translational energy of the ions and "thermalizing" should be understood accordingly. Thus, thermalization is different from reducing only the kinetic energy of an ion, which is referred to herein as translational cooling or kinetic energy damping.

One of the drawbacks of AP-MALDI experiments is that the ions must be transferred from atmospheric conditions to high vacuum conditions in order for mass analysis to take place. Ions need to be transferred to a mass analyser, CID cell or an ion trap maintained at lower pressures, through a series of narrow orifices. As a result of transferring ions from an AP or intermediate pressure region to a vacuum mass analyser region through a narrow orifice, a significant number of ions can be lost, which reduces sensitivity.

Yet another drawback with AP-MALDI is that adducts and ion clusters can form during the desorption/ionization process. Declustering techniques using ion optics, transfer capillaries or sources operating at higher temperatures have been developed to address this but adduct formation is nevertheless often observed above $1.3\times10^{-1}$ mbar (100 mtorr) and becomes more pronounced as the pressure in the source is increased.

Intermediate pressure ion sources have also been designed where ions are subsequently transferred to higher pressure ion guides for faster thermalization (i.e. reduction of ion kinetic and vibrational energy). For example, an elevated (intermediate) pressure ion source has been described as part of a pulsed gas technique for use in a hybrid segmented ion trap TOF mass spectrometer (U.S. Pat. No. 6,545,268 B1 & US2003/0141447 ). In this design, ions are thermalized in an ion source operated at intermediate pressures to promote vibrational energy relaxation (i.e reduce ion internal energy). Ions are subsequently transferred to the ion trap where collisions with the buffer gas lower the kinetic energy of the ions hence improve trapping efficiency.

Helium gas has also been injected into a MALDI source where ions are directly transferred and accumulated in a hexapole ion guide and then mass analyzed in a Fourier transform ion cyclotron resonance (FTICR) cell (Baykut et al, Rapid Commun Mass Spectrom, 2000, 14, 1238). It is thought that the collision gas in the direct proximity of the laser target establishes a translational cooling environment necessary for reducing the wide mass dependent kinetic energy spread and enhancing trapping efficiency in the cell.

Whilst these developments have to some extent reduced the problem of uncontrolled fragmentation, ion production is achieved at elevated (intermediate) source pressures leading to the disadvantages discussed above.

Furthermore, the present inventors have noted that if the disadvantages associated with AP and intermediate pressure MALDI can be avoided by generating ions in a high vacuum source, uncontrolled fragmentation in the ion trap remains a serious problem. Indeed, uncontrolled fragmentation is known to be an unresolved problem (He L., et al, Rapid Commun Mass Spectrom, 11, 1440-1448,(1997); Goeringer D. E., McLuckey S. A., Int J Mass Spectrom, 177, 163-174, (1998); Smirnov I. et al, ASMS Conf, 1999, ThPC 060; Krutchinsky A. N., Chait B. T., J Am Soc Mass Spectrom, 13, 129-134, (2002))

In addressing the drawbacks of known arrangements, the present inventors have found that uncontrolled fragmentation can be significantly reduced whilst minimising ion loss and adduct formation by combining ion production in a high vacuum source with ion thermalization in an ion trap in a transient elevated (intermediate) pressure environment. In particular, the present inventors have found that pulsed gas injection into an ion trap (e.g. QIT) is efficient for significantly reducing or eliminating uncontrolled fragmentation of externally injected molecular ions, whilst maintaining high vacuum conditions in the source.

Indeed, the present inventors have found that there is a pressure threshold above which vibrational cooling (internal energy relaxation) is favoured over energy deposition via collisions in the trap. Hence, intact ions can be preserved and mass analyzed. In addition, the present inventors have found that this threshold can be achieved in an ion trap without adversely affecting the vacuum in the ion source or the mass analyser, by using controlled gas pulses and rapidly pumping the gas from the ion trap between pulses. High vacuum conditions in the ion source can be achieved by controlling the duration of the period of elevated pressure within the ion trap.

In particular, the present inventors have found that the duration of the period of elevated gas pressure in the ion trap can be controlled so that the desirable pressure threshold can be exceeded within the ion trap, whilst the pressure outside the ion trap (e.g. in the ion source and/or detector regions) can remain at high vacuum (typically $10^{-5}$ mbar or less).

The reduction in uncontrolled fragmentation above a particular pressure threshold is surprising given that pressures exceeding about $10^{-3}$ mbar in a QIT are generally avoided. In particular, when ion traps are operated with higher trapping voltages in order to trap heavier ions it is known that higher pressures increase the likelihood of break-down events (discharges). Another reason that ion traps are not normally operated at higher pressures is that the mean free path of the ions (the distance travelled between consecutive collisions with background gas) reduces significantly, thus the efficiency of injecting ions into the trap reduces due to scattering of the incoming ions. In addition, isolation of ions achieved by resonance techniques must be performed at the lower pressures. Both external injection into the trap and ejection out of the trap also require low pressure environments.

The proposals set out herein are based in part on the present inventors' experimental observations that there are competing energy transfer processes when a gas molecule collides with an ion, e.g. in an ion trap. During the first steps of the trapping process the radial and axial excursions of the ions in the trap are wide and kinetic energy available in collisions is similar to that in CID experiments. In this case, translational-to-vibrational energy transfer between neutral species and ions is enhanced. The process of translational cooling proceeds simultaneously and the amplitude of oscillation for the trapped species is gradually reduced. As a result, cross section of the ions increases and eventually thermalized collisions take place, promoting vibrational-to-translational energy transfer. The allowable time window before translational cooling is complete and thermalized collision take place is pressure dependent.

The present inventors have performed experiments in which the pressure of pulsed gas within the ion trap was measured and then adjusted to promote vibrational-to-translational energy transfer (i.e. to favour the relaxation process over the internal energy deposition mechanism), thereby reducinge fragmentation. A pressure threshold has been identified above which the time window for translational cooling is short enough to thermalize ions efficiently, as shown by the significant reduction and in many cases elimination of uncontrolled fragments from the mass spectrum.

In experiments performed by the present inventors, the pressure within the ion trap was controlled by pulsed gas injections, which provide a transient elevated pressure environment. The ion trap was continuously pumped by a vacuum pump during the pulsed gas injection, so the transient elevated pressure was short lived (low milli-second regime). In performing these experiments, the present inventors found that as a result of the rapid pulses of gas and the vacuum pumping, gas diffusion and hence pressure within the ion trap volume was not uniform. Indeed, the present inventors have noted that pressure variations indicated by a standard "tubulated" pressure gauge (i.e. a pressure gauge enclosed in a tube) cannot reflect the rapid variations at different locations inside the trapping volume of the QIT and so pressure measurements cannot be made in the conventional way. In addition, there are physical restrictions which limit the possibilities for fitting a pressure gauge inside a QIT.

In fact, this difficulty in reliably measuring pressure within the ion trap would have previously made it impossible to investigate the effect of pulsed gas pressure on uncontrolled fragmentation.

In order to make pressure measurements within the ion trap, a previously undisclosed measuring protocol and apparatus has been used by the present inventors. This involves directing electrons (typically produced by heating a filament) into the ion trap during a gas pulse, so as to generate positively ionised gas species within the QIT. The ionised species are collected by one of the electrodes of the ion trap that is held at a suitable potential and the resultant positive current flow is measured and converted into a pressure reading. By directing the electrons through the ion trap, it is possible to measure pressure in the region where trapping actually occurs. A schematic illustration of this arrangement is shown in FIG. 3 and is discussed in more detail below.

Using this measurement technique, the inventors have adjusted the duration of the gas pulses and other parameters to produce a range of transient pressure maxima in the ion trap. The extent of uncontrolled fragmentation was then assessed for different peak-pressures and different pressure profiles.

Unexpectedly, the present inventors have found that at pressures above $10^{-3}$ mbar thermalization (stabilization) of the ions by collisions with the buffer gas atoms (or molecules) is very efficient and the problem of uncontrolled fragmentation is significantly reduced. Without wishing to be bound by theory, the present inventors believe that below this pressure threshold, the frequency of collisions is not high enough to remove excess internal energy of the ions. Thus, the process of translational cooling is prolonged in time and as a result ions dissociate before thermalized collision can take place. At pressures above about $10^{-2}$ mbar, reduction in uncontrolled fragmentation is very efficient, as demonstrated by experimental results, presented and discussed further below.

The present inventors have also noted that whilst it is desirable to provide a pressure above this threshold pressure within the ion trap, the formation of ions in the ion source is preferably performed under high vacuum conditions, to avoid the disadvantages discussed above. This is believed to lead to higher ionization efficiency and/or the formation of less adducts and clusters, particularly with MALDI sources, where ionization efficiency is pressure dependent.

However, when an ion trap is located in an enclosure that is differentially pumped with respect to the ion source and analyser/detector region, the period of elevated pressure within the ion trap can affect the pressure outside the ion trap, for example in the ion source and detector region. Indeed, higher pressure in the ion trap (which is preferably differentially pumped) can lead to increased pressures in the ion source and detector region through gas leakage from the ion trap. In a mass spectrometer, an increase in pressure in either or both of the ion source and detector region is undesirable and can introduce significant scattering of the incoming or outgoing ions, therefore reducing sensitivity and even damage to the apparatus when high voltages are used.

Nevertheless, the present inventors have addressed inherent drawbacks of pulsed gas ion traps and found a method of providing an increase in maximum pressure in the ion trap without increasing significantly the duration of the elevated pressure in the trap. Thus, the problem of gas leakage from the ion trap can be reduced. This is based in part on the inventor's understanding that when traps are operated at static pressures, the amount of leakage of gas molecules into the ion source and detector regions is continuous (time independent) and is proportional to the pressure, whereas during pulsed gas introduction, the amount of gas leakage is a function of both the pressure and the duration of the period of elevated pressure within the ion trap. The amount of leakage is therefore related to the residence time of the gas within the ion trap.

The present inventors propose that by controlling the gas pulse within the ion trap (to achieve the desired maximum pressure and the duration of elevated pressure simultaneously) through providing appropriate differentially pumping arrangements, it is possible to remove excess internal energy of the ions before extensive uncontrolled fragmentation occurs, whilst maintaining a high vacuum outside the trap region, including the ion source.

The present inventors propose that a pressure-time profile within the ion trap can be produced so as to have a high maximum pressure (over $10^{-3}$ mbar) for a short duration, e.g. reducing to 25% of the maximum pressure in less than 30 ms from triggering of the gas pulse (e.g. from the start of the electronic signal that actuates the gas inlet valve). This provides efficient thermalization of the ions whilst minimising the effects of gas leakage, e.g. into the ion source and detector region.

Accordingly, in a first aspect, the present invention provides a method of thermalizing ions in a mass spectrometer, said mass spectrometer having an ion source, an ion trap and a detector region, wherein said method includes the steps of:

producing ions in the ion source whilst maintaining the pressure in the ion source below about $10^{-4}$ mbar;

pulsing gas into the ion trap to achieve a peak pressure of more than $10^{-3}$ mbar and externally injecting ions from the ion source into the ion trap; and ejecting ions from the ion trap into the detector region whilst maintaining the pressure in the detector region below about $10^{-4}$ mbar.

By providing an intermediate pressure transient within the ion trap whilst maintaining vacuum conditions in the ion source and detector regions, uncontrolled fragmentation can be significantly reduced and the sensitivity of the mass spectrometer improved.

In preferred embodiments, the present inventors have achieved this by providing a large volume of gas into the ion trap over a comparatively short timescale, and simultaneously pumping the ion trap at a relatively high speed so as to rapidly remove the gas. In particular, by rapidly removing gas from the ion trap, a significant reduction in fragmentation can be achieved whilst maintaining a high vacuum in the source. In this way, the advantages of a high vacuum ion source and/or high vacuum detector region can be preserved.

Preferably the pressure outside the ion trap (e.g. in the ion source and detector region) remains below about $10^{-4}$ mbar during thermalization of the ions, more preferably below about $10^{-5}$ mbar, and most preferably below about $10^{-6}$ mbar. Suitably the pressure outside the ion trap is maintained throughout the period of elevated pressure within the ion trap.

Suitably the pressure in the ion source during ion production is maintained below about $10^{-5}$ mbar, preferably below about $10^{-6}$ mbar. Suitably the pressure in the detector region during ion ejection is maintained below about $10^{-5}$ mbar, preferably below about $10^{-6}$ mbar.

Preferably the peak pressure of the thermalization gas pulse is greater than about $5\times10^{-3}$ mbar, more preferably greater than about $10^{-2}$ mbar. These higher peak pressures preferably provide more efficient thermalization. Suitably, thermalization is achieved over a shorter period of time with these pressures. Suitably, the peak pressure does not exceed about 0.13 mbar (~10 mTorr), more preferably $10^{-1}$ mbar.

Suitably the gas pulse provides a pressure in the ion trap that is short lived in the sense that the pressure rapidly reduces to a value that is a small fraction of the maximum pressure, thereby minimising or preferably avoiding leakage. This pressure reduction time is defined as the time it takes for the pressure in the ion trap to reduce to 25% of the peak pressure, with the start time being the initiation of the gas pulse. Typically, initiation of the gas pulse includes generating a signal that triggers or initiates the gas pulse (i.e. releases the buffer gas into the ion trap). Suitably this is an electronic pulse that is applied to an inlet valve that delivers buffer gas to the ion trap. Preferably the pressure reduction time is less than about 40 ms, more preferably less than about 20 ms, most preferably less than about 15 ms. For peak pressures above about $3\times10^{-2}$ mbar (20 mTorr) it is preferred that the pressure reduction time is 10 ms or less. For lower peak pressures, the pressure reduction time can be greater, e.g. 20 ms or less for a peak pressure below about $5\times10^{-3}$, e.g. $1.3\times10^{-3}$ mbar (1 mTorr).

Preferably the pressure of more than $10^{-3}$ mbar in the ion trap is maintained for no more than 40 ms, more preferably no more than 20 ms.

In preferred embodiments, the width of the gas pulse (the width of the pressure-time profile of the pressure transient in the ion trap) at 25% of the peak pressure is no more than 30 ms, preferably no more than 20 ms and more preferably no more than 15 ms.

Preferably the peak pressure is reached in less than 10 ms, more preferably less then 5 ms, most perfectly less than 3 ms. Whilst there is no particular limitation on the minimum time taken to reach peak pressure, a valve of 0.1 ms is typical. The starting point for establishing the time taken to reach peak pressure is the start of the trigger signal that causes the buffer gas to be released into the ion trap (as described above with respect to the pressure reduction time).

In embodiments the buffer gas pulse is generated using a fast solenoid valve. In order to minimise the time window when the pressure in the ion trap is very high, a number of steps can be taken: (i) maximizing the conductance of gas inlet pipe(s) (e.g. shorter and/or wider pipes) supplying gas to the ion trap (this minimises the broadening of the gas pulse as the gas proliferates through the system, thus allowing the pressure to be increased very rapidly); and/or (ii) maximizing the differential vacuum pumping speed and the conductance of the gas output pipe(s) (shorter and/or wider pipes) that remove gas from the ion trap. In this way, fast intermediate-pressure transients and minimum gas load to the other compartments of the apparatus can be achieved. Ionization can then be performed at high vacuum conditions, which are not affected by high repetition gas pulses (successive ionization events). This is discussed in more detail below.

Preferably the ion trap is located within a trap enclosure so that it can be differentially pumped with respect to the outside of the ion trap, e.g. other parts of the mass spectrometer such as the ion source and detector region. For example, the trap enclosure can include a pressure chamber or manifold. Preferably the trap enclosure has a gas inlet port through which gas is delivered to the trap from a gas inlet system; a gas outlet port through which gas leaves the trap by operation of a vacuum system; and an ion orifice through which ions can enter the ion trap.

Suitably there are two ion orifices, one through which ions are injected into the ion trap from the ion source (the entrance ion orifice) and one through which ions are ejected from the trap to the detector region (exit ion orifice).

Preferably the ion orifice through which ions enter the ion trap are circular. Preferably they have a diameter in the range 0.5 to 3 mm, more preferably 1 to 2 mm. Suitably the ion orifice through which ions exit the trap has a diameter in the same range as discussed for the entrance ion orifice. Typically, the entrance and exit ion orifices have the same diameter.

Suitably, the ion trap is connected to a vacuum system (e.g. a vacuum system is connected to the gas outlet port of the trap enclosure). Preferably the vacuum system includes a vacuum device such as a vacuum pump (e.g. a turbomolecular pump). The vacuum system preferably includes a vacuum conduit (e.g. pipe) that connects the vacuum device to the ion trap (e.g. the vacuum conduit is connected to the gas outlet port of the trap enclosure).

Preferably the ion trap is in gas communication with the vacuum system during ion thermalization, i.e. a vacuum is applied to the ion trap during ion thermalization. Suitably the ion trap is in gas communication with the vacuum system (i.e. a vacuum is applied to the ion trap) throughout ion production, injection and ejection.

The vacuum provided by the vacuum system and applied to the ion trap is preferably selected so that gas is removed from the ion trap sufficiently quickly so that there is no significant gas leakage from the ion trap to the ion source or detector region. Suitably, there is no significant gas leakage from within the trap enclosure through the ion orifice(s). By no significant leakage, it is preferably meant that the pressure outside the ion trap (in particular in the ion source and detector region) does not exceed $10^{-4}$ mbar, more preferably it does not exceed $10^{-5}$ mbar. Suitably it means that the pressure outside the ion trap increases by no more than 2 orders of magnitude, more preferably by no more than 1 order of magnitude, typically from a base pressure of $10^{-6}$ mbar.

Typically, the vacuum device provides a pumping speed of 10 $Ls^{-1}$ or more, preferably 10 to 100 $Ls^{-1}$. An appropriate pumping speed can be selected depending on the size and shape of the trap enclosure and the free volume of the trap enclosure. For example, a pumping speed of around 15 $Ls^{-1}$ may be appropriate for a trap enclosure whose free volume is about $6\times10^{-5}$ $m^3$. Thus, the method preferably includes the step of applying a vacuum pumping speed of 10 $Ls^{-1}$ or more, preferably 10 to 100 $Ls^{-1}$, to the ion trap.

Preferably the gas outlet port is selected so as to permit rapid clearance of gas from the ion trap. Preferably the gas outlet port has a cross-sectional area of at least 5 $cm^2$, more preferably at least 10 $cm^2$, and most preferably at least 15 $cm^2$. The gas outlet port can be any shape (e.g. rectangular, circular, etc) but a rectangular port is preferred. For rectangular ports it is preferred that each of the sides of the port is at least 20 mm long, more preferably at least 40 mm. Suitably at least one of the sides (i.e. each of a pair of sides) is at least 50 mm long, more preferably at least 70 mm long. In the case of circular ports, the diameter of the gas outlet port can be in the range 40 to 100 mm, more preferably 50 to 80 mm.

Preferably the vacuum conduit connected to the gas outlet port has a diameter in the range 40 to 100 mm, more preferably 50 to 80 mm. Suitably the vacuum conduit has a length up to 10 cm, preferably no more than about 5 cm.

Suitably the cross-sectional area of the vacuum conduit changes from the gas outlet port to the vacuum device (e.g. to accommodate the different dimensions of the gas outlet port and the face of the vacuum device). This can be a step change or a taper in the conduit. In embodiments, the vacuum conduit has a funnel shape. This can improve the efficiency with which buffer gas is removed from the ion trap.

Preferably the duration of the gas pulse is controlled so as to obtain the desired pressure profile within the ion trap. The desired pressure profile is determined by the degree of uncontrolled fragmentation observed in the mass spectrum.

Typically, the ion trap is connected to a gas inlet system (e.g. the gas inlet port of the trap enclosure is connected to the gas inlet system). Suitably the gas inlet system includes a gas source (e.g. a reservoir of gas, preferably maintained at approximately a constant pressure). Preferably the gas inlet system includes a gas inlet conduit (e.g. pipe) connecting the gas inlet port to the gas source.

Suitably the gas inlet system includes a gas inlet valve (e.g. a needle valve or poppet valve) operable to control the flow of gas from the gas source to the ion trap. Preferably the diameter of the valve orifice on the front face of the valve (i.e. the face of the valve directed towards the ion trap) is in the range 5 to 300 μm, more preferably 60 to 150 μm.

Preferably, the length of time for which the gas inlet valve is open is controlled so as to obtain the desired pressure profile in the ion trap. In the case of electrically operated valves, the method preferably includes the step of applying a signal to the gas inlet valve for a period of time in the range 1 to 300 μs, more preferably 10 to 200 μs and most preferably in the range 70 to 130 μs. Suitably these times refer to the width of an electric pulse used to activate the valve. Suitably the valve includes a poppet and activation of the valve is achieved by moving the poppet away from the gas flow path of the gas inlet. Suitably valve actuation includes applying an electric signal to the armature of the valve.

Naturally, the duration of the electric pulse applied to the valve will depend on the properties of the valve and the skilled person will be able to adjust the duration of the signal to suit a particular valve.

Longer gas inlet valve opening times can provide higher pressures but also increase the likelihood of increasing the pressure in the ion source and detector region because of leakage from the ion trap.

Preferably the pressure of the gas in the gas source is in the range 0.1 to 10 bar, more preferably 0.5 to 5 bar. Suitably this is also the pressure that is behind the gas inlet valve.

Preferably the diameter of the gas inlet port is in the range 1 mm to 15 mm, more preferably 4 to 10 mm. Suitably, where a gas inlet conduit is present, the diameter of the gas inlet conduit is up to 15 mm, more preferably 1 to 10 mm and most preferably 3 to 6 mm. Preferably the diameter of the gas conduit is the same as the gas inlet port.

Preferably the trap enclosure includes, in addition to the buffer/thermalization gas inlet port, a second gas inlet port. Suitably the second gas inlet port is connected to a second gas inlet system for supplying a second pulsed gas to the ion trap. Suitably the second gas is for inducing dissociation of ions in the ion trap, e.g. as part of a collision induced dissociation (CID) experiment. Thus, the method can also include the step of pulsing a second gas into the ion trap after the ions have been thermalized, to dissociate the trapped ions. Typically the second gas is different from the first (buffer) gas used to thermalize the ions, suitably a heavier gas (e.g. argon, krypton or xenon). In this way, controlled fragmentation experiments (CID experiments) can be performed in the ion trap, e.g. after thermalization.

Preferably the trap enclosure includes a background gas inlet port. Suitably the background gas inlet is connected to a background gas inlet system for supplying a background gas to the ion trap. Suitably the background gas is supplied continuously (rather than in pulses) to the ion trap throughout the experiment cycle. Thus, the method can include the step of supplying a background gas to the ion trap continuously throughout the injection and thermalization of the ions. By providing a constant supply of background gas, the performance of the ion trap can be improved. Preferably the background pressure in the ion trap is maintained at less than about $10^{-5}$ mbar. Suitably the background gas is the same as the thermalization gas.

The desired pressure profiles in the ion trap discussed above can preferably be achieved by controlling one or more parameters selected from (1) the size and structure (free volume) of the ion trap (in preferred embodiments, this will be the size and structure of the trap enclosure within which the ion trap is located); (2) the conductance of the gas inlet system (e.g. one or more of the dimensions of: the gas inlet port, gas inlet conduit, and valve orifice); (3) pressure of gas in the gas source; (4) duration of opening of the gas inlet valve (e.g. duration of electric signal applied to the valve); (5) vacuum pumping speed of the vacuum device; (6) conductance of the gas outlet system (e.g. dimensions of the gas outlet port and vacuum conduit); and (7) dimensions of the ion orifice(s) through which ions pass into and out of the trap.

Preferably the method includes providing a plurality of pulses of thermalization gas to the ion trap. Multiple pulses can be used to cool multiple respective sets of ions (e.g. those produced as a result of each of a series of laser shots in a MALDI experiment), or to thermalize the same set of ions (e.g. repeated thermalization of the same ions whilst held in the ion trap). Furthermore, as part of the same experimental cycle, a plurality of gas pulses can be used, wherein the second and subsequent pulses are for translational cooling damping the kinetic energy of the ions, for example following isolation and/or dissociation events as encountered in, $MS^n$ experiments.

In embodiments where a plurality of thermalization gas pulses are used, the frequency of the pulses is preferably in the range of 1 to 100 pulses per second. More preferably in the range of 10 to 20 pulses per second.

Suitably the frequency of the pulses is the same as the frequency of ion production, e.g. the frequency of laser shots in a MALDI system.

The method of the present invention typically reduces the duration of an experiment cycle and so higher rates of ion production can be achieved (e.g. higher rates of laser firing) and therefore higher frequency of thermalization gas pulses. Preferably the experimental cycle (ion production, trapping, thermalization, and mass analysis) takes less than 150 ms, more preferably less than 100 ms and most preferably less than about 50 ms.

By observing the pressure profile within the ion trap, the present inventors have also obtained insights into the optimum time for injecting ions in the trap. The present inventors have found that the timing of the entry of the ions into the ion trap with respect to the pressure in the trap can affect the efficiency of thermalization.

Indeed, optimum sensitivity (maximum trapping efficiency) can be achieved when ion injection (suitably ion injection into the vicinity of the trap to substantially) coincides with the peak (i.e. maximum) pressure.

Thus, the method preferably includes the step of coordinating or synchronizing the production of ions and the pulsing of the thermalization gas so that the ions arrive at the ion trap when the pressure within the trap is greater than $10^{-3}$ mbar.

Preferably the ions enter the ion trap when the pressure within the trap is at least 80% of the peak pressure, more preferably at least 90% of the peak pressure and most preferably at about the peak pressure. Preferably the gas pressure in the ion trap is increasing when the ions enter the trap.

The improved sensitivity observed experimentally when ion arrival time is coordinated in this way indicates that there is little or no scattering of ions by the thermalization gas at the entrance ion orifice of the trap, which in turn suggests that there is little or no leakage of gas through the orifice into the source.

Suitably the method includes trapping the ions in the trap following ion injection.

Preferably translational cooling of the ions is also promoted so as to enhance trapping efficiency of ions with large radial and axial excursions with initially unstable trajectories at the onset of the trapping field.

Following injection and thermalization of the ions in the ion trap, the subsequent stages of the experimental cycle of the ion trap can be performed at lower pressures. In other words, the elevated pressure within the ion trap does not have to be maintained after ion thermalization has occurred. Thus, the method preferably includes the step of reducing the pressure within the ion trap, preferably so that the pressure is below $10^{-3}$ mbar, more preferably below about $10^{-4}$ mbar, most preferably below about $10^{-5}$ mbar.

By conducting the subsequent processing steps at a lower pressure, higher resolution during selective isolation or resonant ejection techniques is achievable, as the frequency of ion motion is no longer substantially altered by collisions. A lower subsequent ion trap pressure preferably also facilitates ion extraction to a TOF mass spectrometer by increasing the mean free path of the ions. Thus, the step of ejecting ions to the detector region preferably occurs whilst the pressure in the ion trap is less than about $10^{-4}$ mbar, more preferably less than about $10^{-5}$ mbar, and most preferably less than about $10^{-6}$ mbar. In preferred embodiments, the pressure within the ion trap is about the same as the pressure in the detector region during ejection of the ions.

Preferably the ion source includes a laser for producing ions from a sample. Suitably the detector region includes a TOF analyser.

Suitably the ion source and detector region are selected from those known to the skilled worker.

In preferred embodiments the ion trap is a QIT (for example, a 3D QIT or a linear QIT). Other ions traps are possible, such as a digital ion trap, a Fourier Transform Ion Cyclotron Radiation (FT-ICR) trap or a linear ion trap.

Preferably the TOF mass spectrometer includes an ion reflectron.

Preferably the mass spectrometer is a vacuum MALDI QIT MS or a MALDI QIT TOF MS.

Preferably the mass spectrometer is a vacuum MALDI mass spectrometer.

Preferably the thermalization gas is selected from hydrogen, helium, neon, argon, nitrogen, krypton and xenon. The heavier gases, in particular krypton and xenon, are particularly suitable for use with heavier ions.

Preferably the method includes the step of detecting the ions ejected from the ion trap. Preferably the method includes the step of assigning mass information to the detected ions.

Suitably the method includes analysing the ions in the trap using resonance ejection techniques. Alternatively or additionally ions can be ejected into a TOF MS analysis system.

In preferred embodiments, the mass spectrometer or hybrid mass spectrometer is equipped with a pulsed source for producing MALDI ions at high-vacuum ($<10^{-4}$ mbar, preferably $<10^{-5}$ mbar)conditions. A lens employing static or dynamic electric fields directs ions from the sample plate into the ion trap (e.g. QIT). Ions preferably accelerate through the lens preferably without experiencing collisions with any gas. Ions enter the ion trap and are decelerated in a static or time dependent electric field before the RF trapping field is applied. At the same time, pulsed gas introduced via a gas inlet valve enters the trap volume and the pressure in the ion trap is increased from high-vacuum conditions to more than $10^{-3}$ mbar (0.75 mtorr), but preferably less than about 0.13 mbar (100 mtorr), preferably within 1-5 ms. The ion trap region is differentially pumped to control the excess gas load to the other compartments of the instrument. In comparison, the time of flight of ions from ion generation to entering the vicinity of the trap is preferably 1-100 μs.

Embodiments of the present invention provide the ability to combine the advantages of a high-vacuum ion source with an ion trap (e.g. QIT) operated at much higher pressures which allow for rapid thermalization of thermally labile molecular ions. Fast pressure transients eliminate the gas load to the surrounding environment and increase the amount of gas at a given time present in the ion trap region.

In a second aspect, the present invention provides a method of thermalizing ions in an ion trap, said method including the steps of;

pulsing gas into the ion trap and pumping gas from the ion trap to achieve a peak pressure of more than $10^{-3}$ mbar; and injecting ions into the ion trap; wherein the pressure in the ion trap returns to about 25% of the peak pressure within about 30 ms from initiation of the gas pulse.

Preferably the pressure in the trap returns to about 25% of the peak pressure within about 20 ms, more preferably within about 15 ms.

Suitably initiation of the gas pulse is the start of a trigger signal that is provided to release the buffer/thermalization gas into the ion trap.

Preferably the peak pressure is at least about $5\times10^{-3}$ mbar, more preferably at least about $10^{-2}$ mbar.

The optional and preferred features discussed in respect of the other aspects of the invention can also apply, singly or in any combination, to this aspect.

In a third aspect, the present invention provides a method of thermalizing ions in an ion trap, said method including the steps of;

pulsing gas into the ion trap and pumping gas from the ion trap to achieve a peak pressure of more than $10^{-3}$ mbar; and injecting ions into the ion trap; wherein the width of the gas pulse at 25% of the peak pressure is no more than 30 ms.

The "width of the gas pulse" as used herein means the width of the pressure-time profile of the gas pulse in the ion trap.

Preferably the width of the gas pulse at 25% of peak pressure is no more than 20 ms, more preferably no more than 15 ms.

The optional and preferred features discussed in respect of the other aspects of the invention can also apply, singly or in any combination, to this aspect.

In a fourth aspect, the present invention provides a method of configuring a mass spectrometer having an ion source, an ion trap and a detector region, wherein said method includes the step of selecting the duration of a gas pulse to be injected into the ion trap so that in use the pressure within the ion trap temporarily exceeds $10^{-3}$ mbar, whilst maintaining a pressure of less than about $10^{-4}$ mbar in the ion source and detector region.

Preferably the step of selecting the duration of the gas pulse includes selecting the duration of an electric pulse applied to a pulsed gas inlet valve (e.g. applied to the armature of a gas inlet valve). Suitably this includes selecting a duration of between 10 to 200 μs, more preferably 70 to 130 μs, for example about 90 μs.

The duration of the electric pulse applied to the pulsed gas valve will in turn regulate the opening time of said pulsed gas valve, which will in turn regulate the amount of gas released into the trap inlet orifice.

Preferably the pressure in the ion source and detector region is maintained at less than $10^{-5}$ mbar.

The optional and preferred features discussed in respect of the other aspects of the invention can also apply, singly or in any combination, to this aspect.

In a fifth aspect, the present invention provides apparatus for thermalizing ions in a mass spectrometer, said mass spectrometer having an ion source, an ion trap and a detector region, wherein said apparatus includes ion trap pressure control means that in use generates a pressure in the ion trap that is greater than $10^{-3}$ mbar by pulsing gas into the ion trap so that ions entering the trap experience a pressure of greater than $10^{-3}$ mbar, whilst maintaining a pressure of less than about $10^{-4}$ mbar in the ion source and detector region.

Preferably the ion trap pressure control means include a trap enclosure within which the ion trap is located, wherein the trap enclosure includes a gas inlet port, a gas outlet port and at least one ion orifice through which ions can enter the ion trap.

Preferably the diameter of the ion orifice through which the ions enter the pressure chamber is in the range 0.5 to 3 mm, more preferably 1 to 2 mm. Suitably the trap enclosure includes two ion orifices: an entrance orifice through which ions enter the ion trap, and an exit orifice through which ions exit the ion trap. Suitably the diameter of each ion orifice is independently selected from the above ranges. Typically, the ion orifices have the same diameter.

Preferably the gas outlet port is connected to a vacuum system. Preferably the vacuum system includes a vacuum device such as a vacuum pump (e.g. a turbomolecular pump). The gas outlet port is preferably connected to a vacuum conduit that connects the vacuum device to the gas outlet port and hence the ion trap.

Preferably the dimensions of the gas outlet port and vacuum conduit are as discussed above with respect to the first aspect. Similarly the features of the vacuum device are as discussed above with respect to the first aspect.

Suitably the gas outlet port and, where present, the vacuum conduit have dimensions that allow gas to be removed from the ion trap sufficiently quickly so that there is no significant gas leakage from the ion trap to the ion source or detector region. Suitably this means that a pressure of less than about $10^{-4}$ mbar, more preferably less than about $10^{-5}$ mbar is maintained in the ion source and detector region. Suitably, there is no significant gas leakage from within the trap enclosure through the ion orifice(s).

Suitably the gas inlet port is connected to a gas inlet system. The gas inlet system preferably includes a gas source (e.g. a reservoir of gas, preferably maintained at approximately a constant pressure). Suitably the gas inlet port is connected to a gas inlet conduit. Preferably the gas inlet conduit is associated with a gas inlet valve (e.g. a needle valve or pulsed poppet valve). Suitably the gas inlet valve is operable so as to control the flow of gas from the gas source to the ion trap.

Preferably the diameter of the gas inlet port, the diameter of the gas inlet conduit and the diameter of the valve orifice are as discussed above with respect to the first aspect.

Preferably the ion trap pressure control means includes a pulse controller for controlling the duration of the gas pulse so that the pressure in the ion source and detector region does not exceed $10^{-4}$ mbar, preferably $10^{-5}$ mbar. Suitably the pulse controller operates the gas inlet valve.

Suitably the pressure in the ion source and detector region is measured by a pressure gauge.

Suitably the pulse controller includes software. Preferably the controller (e.g. software) permits a user to input or select a suitable gas pulse duration time.

Preferably the apparatus includes an ion source vacuum device that applies a vacuum to the ion source during use. Preferably the apparatus includes a detector region vacuum device that applies a vacuum to the detector region during use.

The optional and preferred features discussed in respect of the other aspects of the invention can also apply, singly or in any combination, to this aspect.

In a sixth aspect, the present invention provides a mass spectrometer having ion trap pressure control means according to the fifth aspect. Preferably the mass spectrometer includes an ion source, ion trap and detector region.

The optional and preferred features discussed in respect of the other aspects of the invention can also apply, singly or in any combination, to this aspect.

In a seventh aspect, the present invention provides a method of modifying a mass spectrometer having an ion source, an ion trap and a detector region, the method including the step of installing ion trap pressure control means according to the fifth aspect.

The optional and preferred features discussed in respect of the other aspects of the invention can also apply, singly or in any combination, to this aspect.

Other aspects and optional features of the invention included herein are as defined in the claims.

Each of the aspects previously described may be combined with one, more than one or all of the other aspects, and features within each of the aspects may be combined with features from the other aspects. Therefore, in a further aspect, the present invention provides a method or apparatus including one, more than one or all of the previous aspects.

BRIEF DESCRIPTION OF DRAWINGS

Embodiments of the invention are described below, by way of example only, with respect to the accompanying drawings, in which.

DETAILED DESCRIPTION OF EMBODIMENTS OF THE INVENTION

Figure 1:
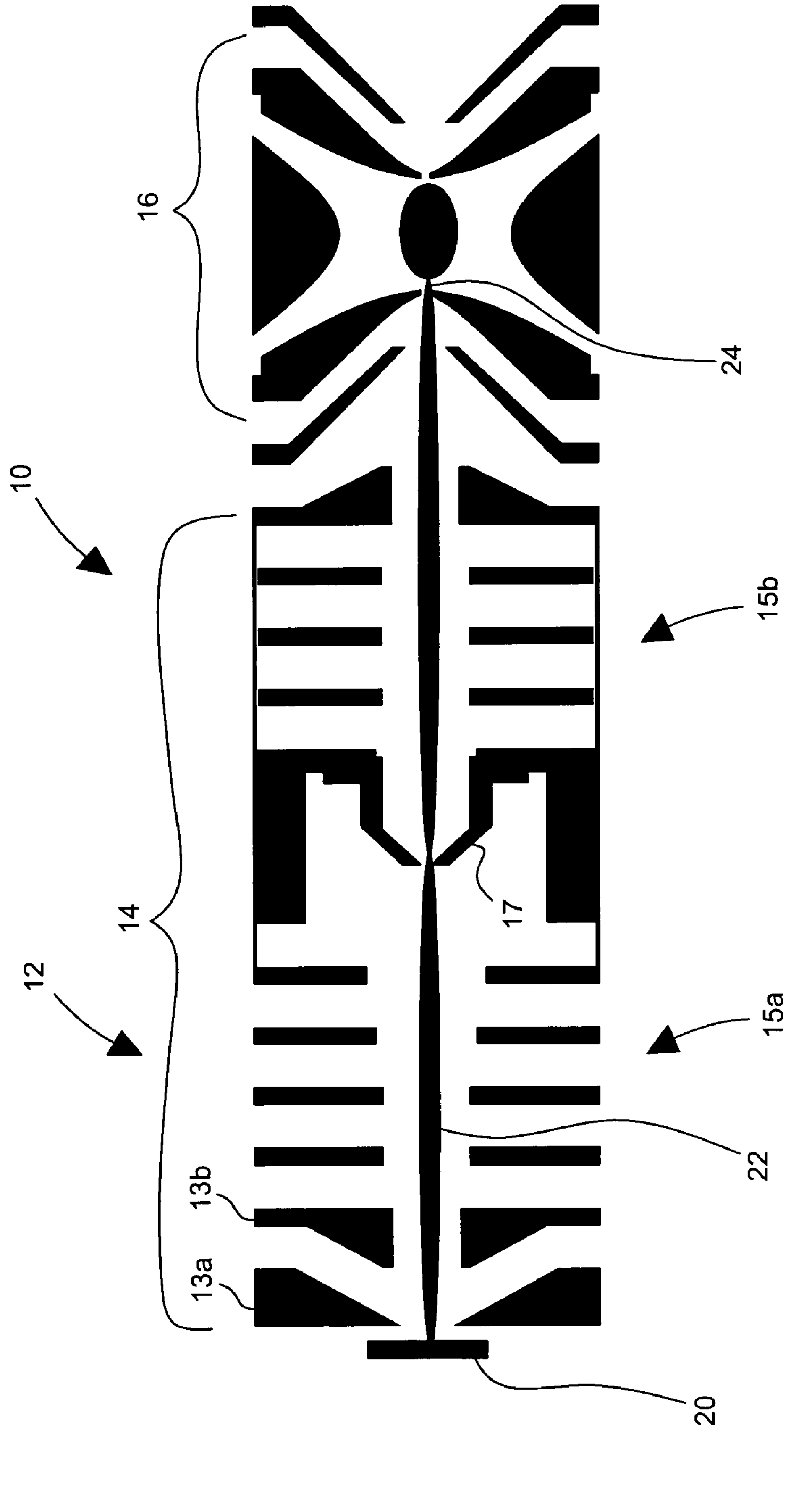
FIG. 1 illustrates schematically a mass spectrometer having an ion source, an electrostatic lens and a quadrupole ion trap.

FIG. 1 illustrates a MALDI mass spectrometer 10 having an ion source 12, which ion source includes a lens system 14, and an ion trap 16. A detector region (not shown) lies to the right of the ion trap. The detector region can include a TOF analyser.

Screen electrode 13$a$ is used to alter the field-gradient on top of the sample plate 20 on which an analyte is placed by generating a weak electric field. This screens the sample plate 20 from the high voltage applied on second electrode 13$b$. The lens system 14 includes two Einzel lenses 15$a$ and 15$b$. The first Einzel lens 15$a$ focuses ions on top of the sample plate and re-focuses the ion beam at the electrode-mirror 17—the second lens 15$b$ projects the focal point from the electrode-mirror to the entrance of the end-cap orifice of the QIT 16. The electrode-mirror 17 directs a laser beam onto the sample plate 20 so as to ionise the analyte.

In preferred embodiments of the present invention, a laser source provides a pulse of light used to produce ions from the surface of the target 20 carrying a light absorbing matrix and a sample. The matrix can be a “hot” or “cold” matrix, which terms are known to those skilled in the art.

The laser produces a plume of ions 22 that are ejected from the target. The ion source 12 and target 20 are maintained under high-vacuum conditions (less than $10^{-4}$ mbar, preferably less than $10^{-5}$ mbar). The ions are accelerated towards the ion trap 16.

In the embodiment shown in FIG. 1 and other preferred embodiments the ion trap is a QIT. The ions 22 are directed through the introduction end-cap orifice 24 of the QIT. The pressure in the ion source and the lens system is maintained at high vacuum conditions (less than $10^{-4}$ mbar (0.075 mTorr)) throughout the experimental cycle.

At $10^{-4}$ mbar the mean free path $\square_g$ of the neutral buffer gas at room temperature is about 137 cm. At 0.1 mbar this reduces to 0.137 cm.

Thus, embodiments of the present invention operating with a high vacuum source (i.e. less than $10^{-4}$ mbar) provide an ion source environment in which the frequency of ion-neutral collisions is very low and cannot thermalize the ions. The drawbacks discussed above in relation to AP atmospheric pressure and intermediate pressure sources are therefore avoided.

Ions can be stored, selectively isolated, dissociated and mass analyzed either in the QIT, e.g. by using a mass scan (resonance ejection technique) or by being ejected into a TOF mass analyser (not shown).

Figure 2:
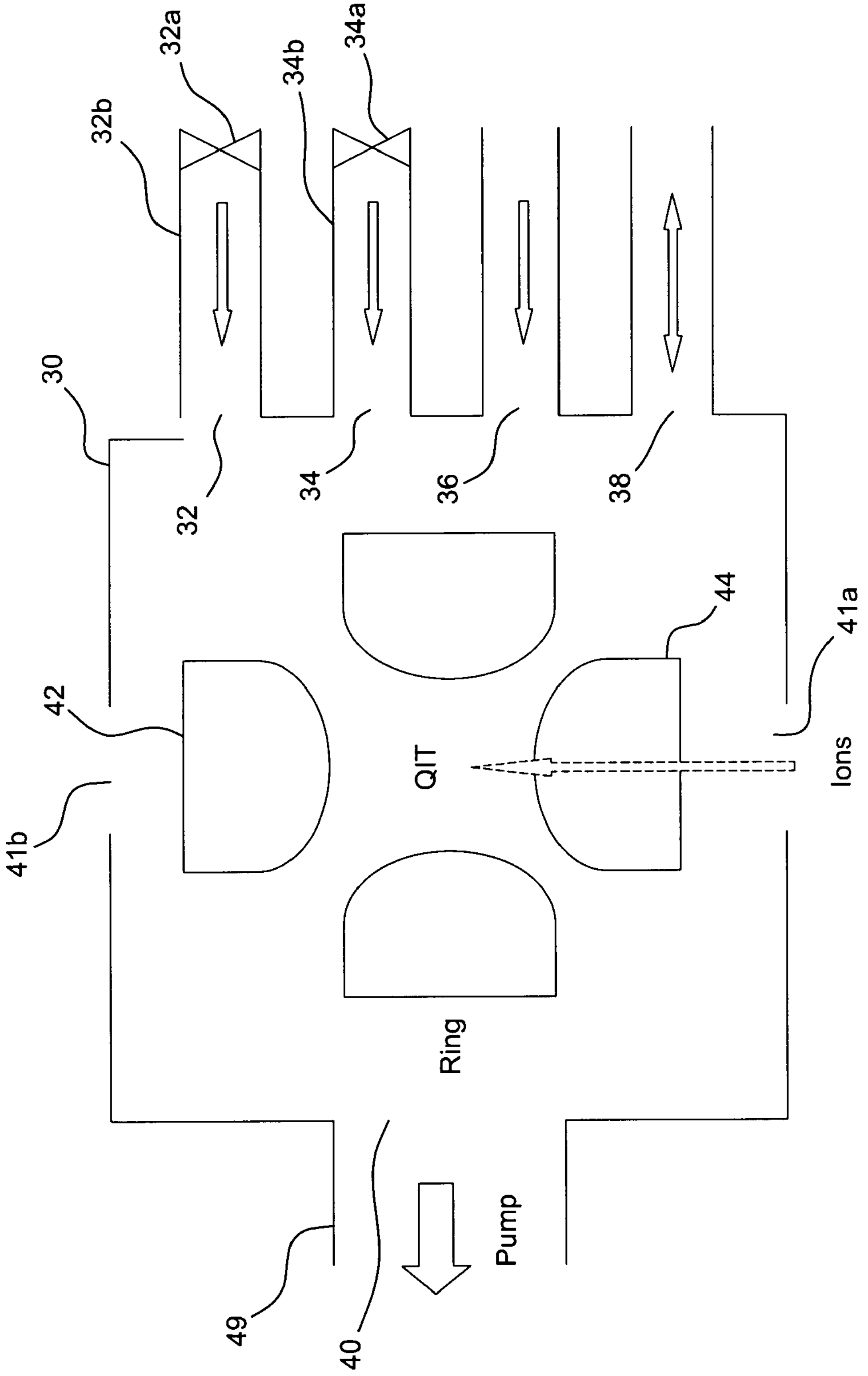
FIG. 2 is a schematic diagram of an embodiment of the present invention in which a differentially pumped QIT device has gas inlets to allow for static and dynamic control of pressure, a pressure gauge and a gas outlet.

In preferred embodiments, the QIT is enclosed in a differentially pumped trap enclosure, such as the one shown in FIG. 2. Three ports (pulsed gas inlet port 32, second pulsed gas inlet port 34 and continuous gas inlet port 36) are used to deliver gas into the trap enclosure. A fourth port 38 connects a pressure gauge to the trap, and the gas is pumped from the trap through gas outlet port 40.

Two pulse valves 32*a* and 34*a* are located in respective pulsed gas inlet pipes 32*b*, 34*b* and are operated so as to deliver gas injections every 50 ms. Alternative pulse frequencies are possible (e.g. every 50-100 ms). The two gas inlets 32, 34 and their associated valves 32*a*, 34*a*, operate at different times in the experimental cycle. At the start of the experimental cycle, thermalization gas is delivered via inlet pulse valve 32*a* and inlet orifice 32. After thermalization has occurred and a precursor ion has been isolated (if necessary), dissociation gas is delivered via inlet valve 34*a* and inlet orifice 34.

The amount of gas introduced into the ion trap is controlled by the characteristics of the gas inlet system(s) such as the pulsed valve orifice size (e.g. a diameter of 50-300 μm) and the pressure in the pipes behind the valve (e.g. 0.1-10 bar). In this and other preferred embodiments the valve orifice (the orifice on the front face of the valve) has a diameter of 100 μm, the gas pressure behind the valve is 3 bar and a Parker Haniffin gas valve is used.

The enclosure is pumped by a 70 $Ls^{-1}$ turbomolecular pump (not shown) connected to gas outlet port 40, although other vacuum devices can be used. Gas outlet port 40 is rectangular, and measures 23.5 mm×70 mm, and the vacuum conduit 49, which connects the gas outlet port 40 to the turbomolecular pump, has a length of 53.5 mm. The wide diameter gas outlet port 40 and vacuum conduit 49 provide a high gas conductance between the turbomolecular pump and the ion trap, allowing the gas pressure in the trap to be rapidly reduced.

Entrance and exit ion orifices 41*a* and 41*b* in the trap enclosure 30, through which, respectively, ions pass from the ion source 12 to the ion trap 16 and from the ion trap to the detector, both have a diameter of 1 mm, although other sizes are possible.

Figure 3:
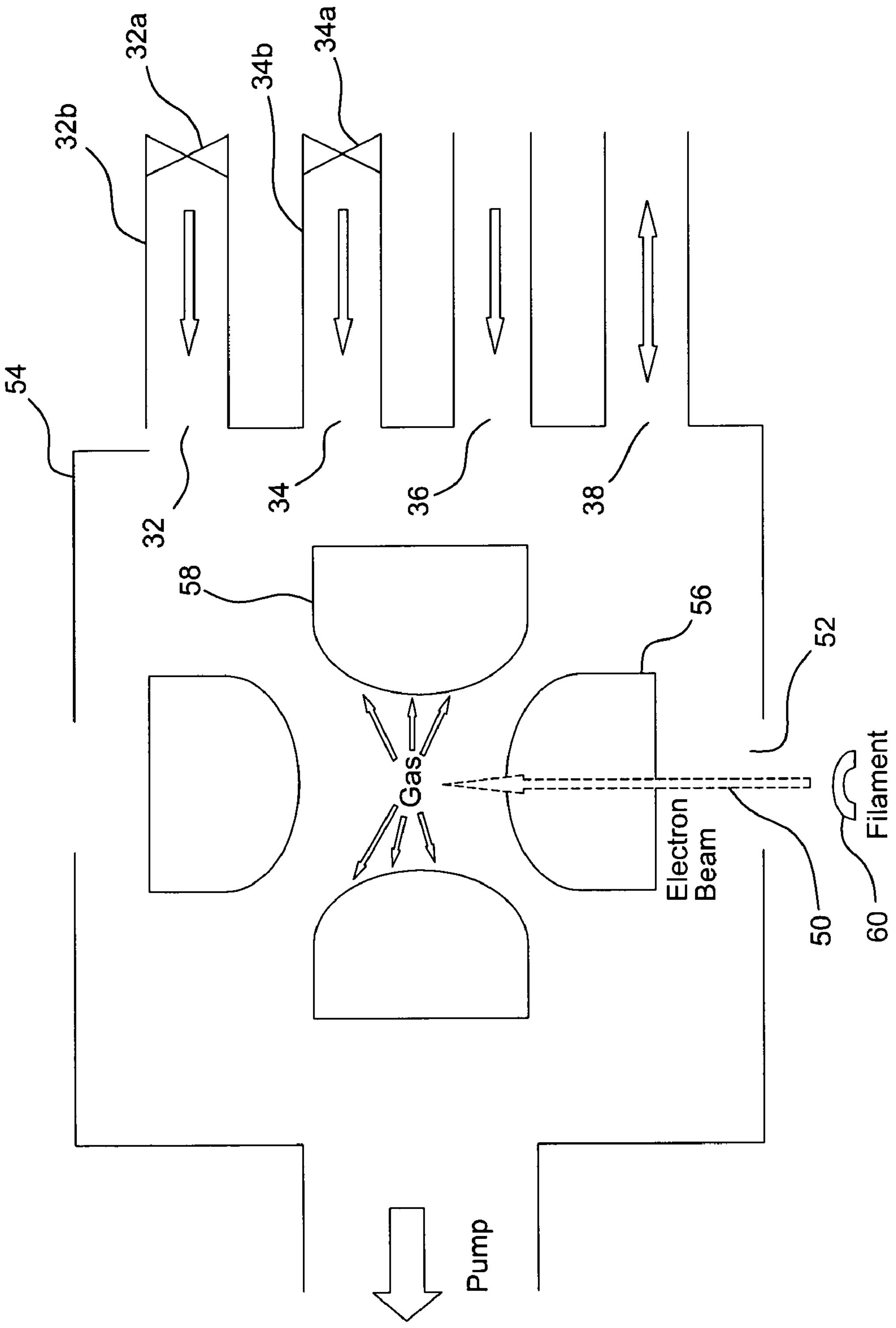
FIG. 3 is a schematic diagram of a modified QIT device incorporating an electron gun to perform dynamic pressure measurements inside the QIT volume.

A pulse of gas is released by the pulsed gas inlet valve 32*a* (by applying an electric actuating signal to the valve 32*a*) and transferred through the corresponding pulsed gas inlet conduit 32*b* and gas inlet port 32 into the trap enclosure 30. Experiments performed with this particular gas inlet system (gas inlet conduit 32*b* has a length of 7 cm and a diameter of 10 mm) show that the gas enters the QIT volume within less than 1 ms and the pressure within the ion trap can be rapidly increased by several orders of magnitude (measured using the pressure measuring arrangement shown in FIG. 3). In this embodiment the base pressure was raised from $10^{-6}$ mbar ($7.5\times10^{-4}$ mtorr) to more than $2\times10^{-2}$ mbar (15 mTorr) within about 1 ms. The pressure recovered back to 25% of the peak height within 25 ms from the start of the valve actuating signal.

At the end of the first millisecond after the gas pulse, as pressure is building up inside the QIT, a pulse of laser light vaporizes and ionizes material deposited on the surface of the target. Following the laser pulse, ions fly through the lens system maintained at high-vacuum conditions and enter the QIT. The flight times for ions from the source to the QIT typically range from about 5 to about 40 μs, depending on the m/z ratio.

Ion optics (such as Einzel-type lenses 15*a*,15*b*) are arranged to focus the ion beam at the entrance ion orifice 41*a*. In this way, the cross section of the beam is minimized in order to maximize transmission into the trap. In this and other prefer-red embodiments, the source geometry has rotational symmetry.

A retarding field established by the appropriate voltage applied to the end cap 42 of the QIT decelerates and stops the ions as they enter the ion trap, before an RF trapping field is switched on. The retarding field for positive ions can be generated either by applying a positive voltage on the exit end-cap 42 or a negative voltage on the introduction end-cap 44. Since the arrival time to the trap is mass dependent, the starting time of the RF signal relative to the laser shot defines the mass range of trapped ions.

Preferably, strong electric fields are applied across the lenses between the target and the ion trap to reduce the arrival time difference between adjacent masses, therefore increasing the mass range that can be trapped for a single ionization event. Once the pulsed gas used for thermalization is removed, ions can be selectively isolated, dissociated by pulsing a second gas and finally mass analyzed at the lower pressures.

Pulsing thermalization gas throughout a mass analysis experiment using a QIT is a significant departure from the traditional operation of such devices at static background pressures. Trapping efficiency of externally formed ions, storage, isolation, dissociation and ejection exhibit different pressure requirements as, well as different gas species. Enhanced performance can therefore be achieved by pulsing gases to independently optimize the numerous functions executed in a QIT.

The residence time of pulsed gases in the QIT has so far been obtained only by indirect measurements, e.g. time-resolved trapping or CID efficiency experiments.

However, a new, previously undisclosed, experimental method to determine the pressure profile in the region where ions are stored and manipulated has been developed and was briefly described above. In more detail, with reference to FIG. 3, the method involves focusing a continuous electron beam 50 through the orifice 52 of pressure chamber 54 and introduction end-cap 56 of the QIT device to ionize any gas present. The positive ion current transient collected on the ring electrode 58 is monitored by a fast oscilloscope and used to determine the pressure profile during pulsed introduction of the gas.

This measurement method is feasible because ion current is proportional to pressure. The dynamic system is calibrated against an ionization gauge measuring pressure inside the differentially pumped region when the QIT is operated at steady state conditions. The electron beam is generated by heating a filament 60. Electron current is monitored on the exit end-cap to determine the number of electrons available for ionization inside the ion trap volume. The gas inlets and outlets are as described with respect to FIG. 2.

Figure 4:
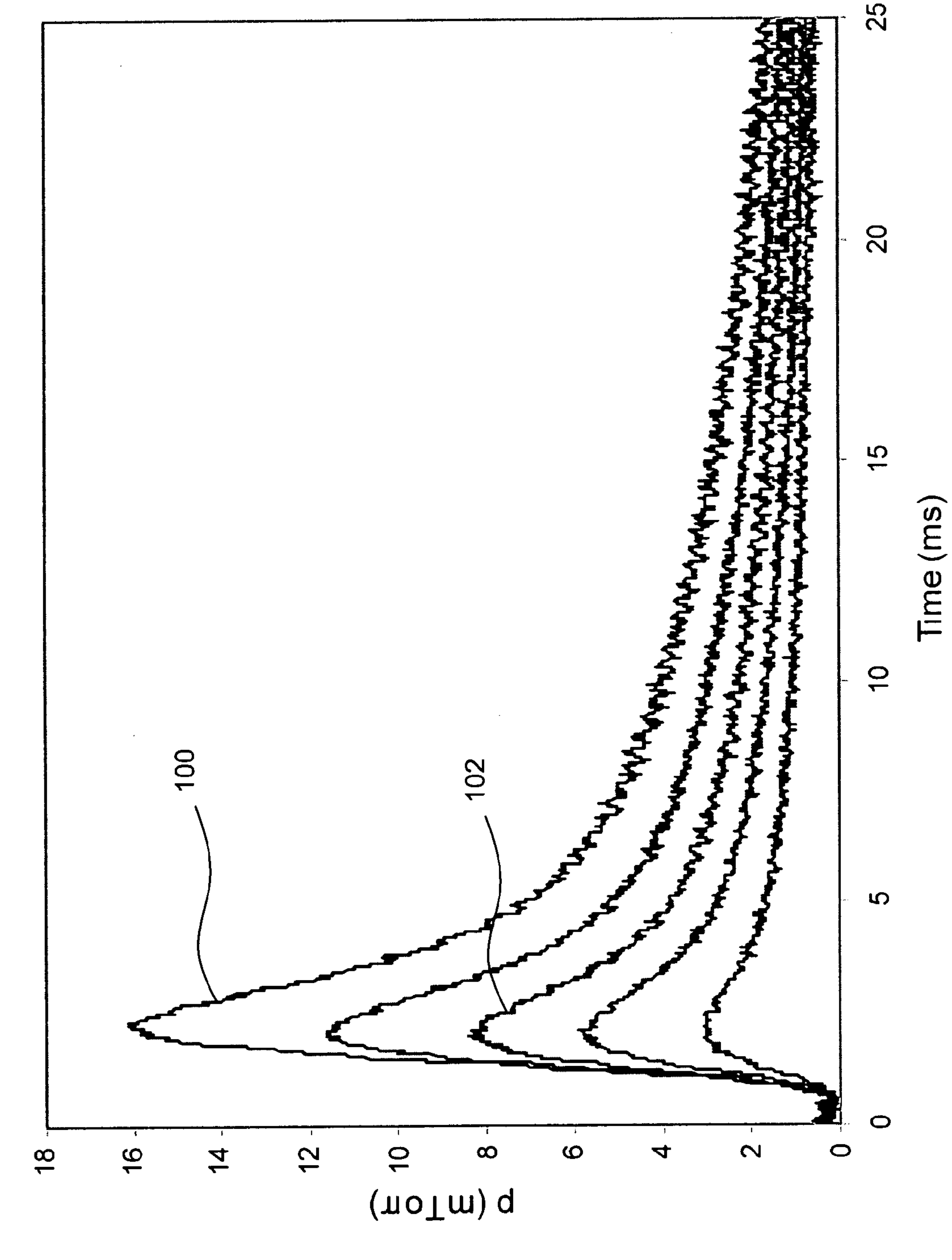
FIG. 4 shows a graph of the results of experimentally determined dynamic pressure profiles during pulsed gas introduction of helium gas into the differentially pumped QIT of FIG. 2 or FIG. 3.

Examples of dynamic pressure profiles for a series of helium gas injections are shown in FIG. 4. Thermalization Helium gas was delivered to the ion trap via gas inlet valve 32*a* and gas inlet port 32. The residence time of the gas in the trap is sufficiently short to minimize the gas load on the surrounding compartments of the instrument, as indicated by the pressure gauge in the ion source, where pressure is maintained below $10^{-5}$ mbar ($7.5\times10^{-3}$ mTorr).

In particular, for the higher peak pressures such as the 16 mTorr max pressure profile 100, shown in FIG. 4, the pressure reduction time is about 10 ms (the time taken for the pressure to reduce to 25% of peak pressure, i.e. 4 mTorr). With shorter and narrower pressure profiles, e.g. at a peak pressure of 8 mTorr 102, the pressure reduction time becomes longer. In this case the time that the pressure recovers back to 2 mTorr (25% of the peak pressure) is about 15 ms. This indicates that the pressure decay time is dependent on the peak pressure. This may be explained by considering the degassing rates, which become more pronounced at lower pressures and result in a comparatively slower overall pressure reduction at those lower pressures, thus longer time intervals to recover back to 25% of the peak pressure.

The second pulsed gas inlet 34 is used to inject argon subsequent to the transient peak pressure of thermalization gas. The argon pulse is used to enhance the efficiency of collision induced dissociation experiments after the ions have been thermalized. Both pulsed gases (the thermalization gas and the fragmentation gases used for dissociation (CID)) can promote translational cooling (kinetic energy damping) of the ions so as to improve trapping efficiency of injected ions and eventually confine the ion cloud to the centre of the trap where thermalized collision can take place.

The continuous (i.e. non-pulsed) delivery of gas through continuous gas inlet orifice 36 is used to regulate the background pressure, which is maintained at about $10^{-5}$ mbar to improve the performance of the system.

Figure 5:
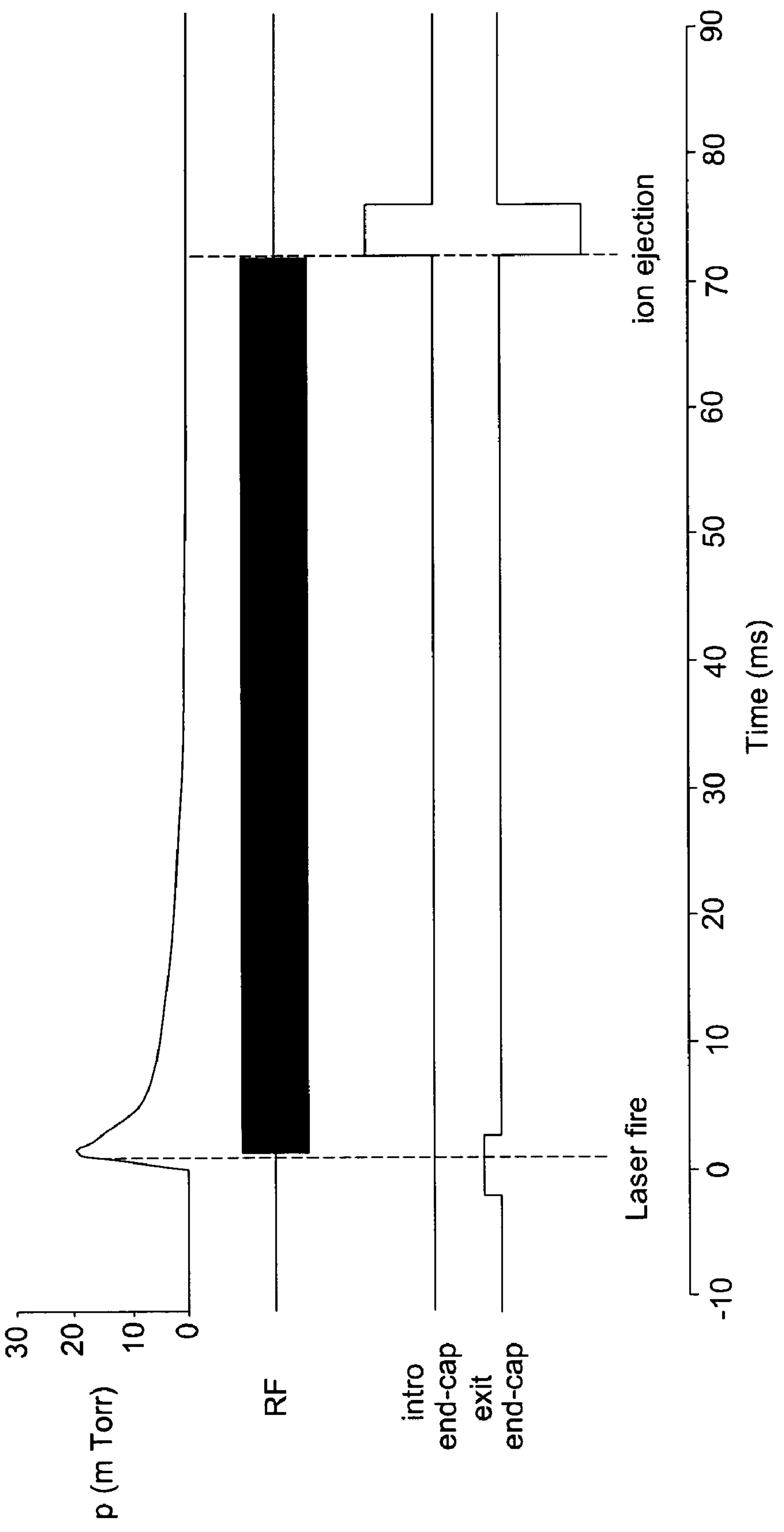
FIG. 5 shows a timing diagram for the operation of a mass spectrometer including the QIT device of FIG. 2.

FIG. 5 shows the time-sequence of events for a complete mass spectrometric analysis in a preferred embodiment where ions are extracted from the QIT device such as the one shown in FIG. 2 and mass analyzed by a TOF system. The experimental cycle is triggered by the electric pulse applied on the valve to release the thermalisation gas packet. In this example, ions are injected into the QIT before the pressure transient has reached its peak. A positive pulse is applied to the exit end-cap to decelerate ions as they enter the QIT. The starting time and corresponding amplitude of the RF signal determines the mass range of interest that can be trapped and stored. The retarding field may or may not overlap with the RF signal during the first few μs.

In this embodiment, ions can be thermalized by collisions with the gas in a pulsed dynamic pressure regime, which thermalisation could not be achieved without affecting the pressure in the ion source and/or detector region if the flow of the cooling gas was continuous rather than pulsed.

Figure 6:
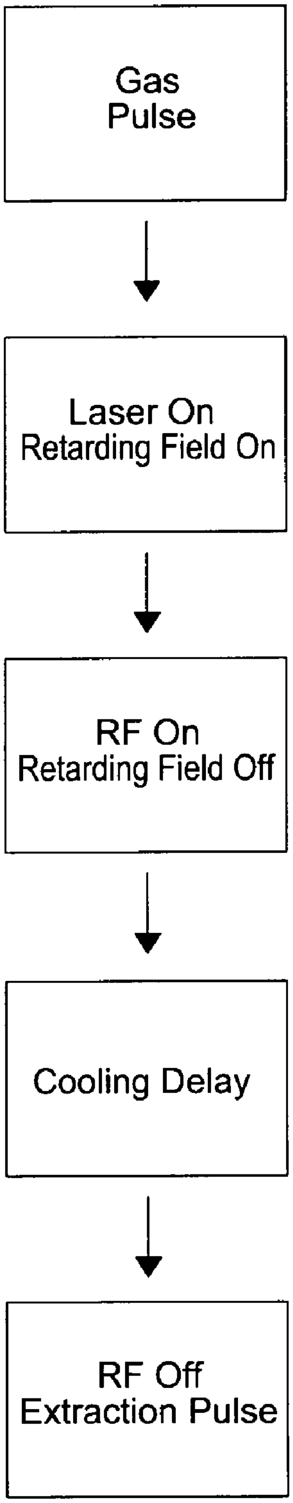
FIG. 6 shows a flow chart diagram indicating the time sequence of events for mass analysis in a MALDI QIT TOF MS, in accordance with the timing diagram shown in FIG. 5.

Once the pulsed gas has been removed from the trap, ions are extracted by two simultaneous electric pulses applied on the two end-caps 42,44. The complete cycle for mass analysis of a single ionization event would typically be in the range of 15 to 40 ms. A flow chart of a typical experimental cycle is shown in FIG. 6.

As discussed above, a threshold in the transient pressure peak has been identified experimentally, above which uncontrolled fragmentation is minimized and in many cases eliminated. It can be inferred that pressure transients above this threshold can cool translational motion fast enough thus sufficiently reduce the internal energy of the molecular ions before they dissociate into fragments.

With reference to FIG. 4, reduction in the degree of fragmentation is observed for pressures above $10^{-3}$ mbar (0.75 mtorr).

In many embodiments, the upper pressure threshold that can be used for thermalization is limited by the ability of the system to pump out the thermalization gas in a sufficiently short period of time so as to reduce the gas load to the other compartments of the instrument (e.g. minimise leakage to the ion source and detector region). The residence time of the gas in the differentially pumped region is determined by the pumping speed of the QIT pressure enclosure, the background pressure and the amount of gas injected by the valve. Increasing the pumping speed reduces the maximum pressure that can be achieved for a given amount of injected gas. Any reduction in the pumping speed of the system increases the residence time of the gas therefore the gas load to the surrounding environment. Pressures above $10^{-3}$ mbar and below about $1.33\times10^{-1}$ mbar (100 mtorr) were found to sufficiently minimize uncontrolled fragmentation for a wide range of peptides, without overloading the system which would result in breakdown events due to high voltages employed, scattering of ions during introduction and extraction from the QIT volume and inevitably longer experimental duty cycles.

In a preferred embodiment incorporating a pulsed source operating at high vacuum conditions, a lens system, a QIT and a TOF system for mass analysis, the useful pressure range defined by the peak of the pressure profiles is $1.33\times10^{-3}$ mbar to $1.33\times10^{-1}$ mbar (1-100 mTorr) with the elevated pressure falling to 25% of peak pressure within about 20 ms from initiation of the gas pulse.

With this sort of arrangement, efficient thermalization can take place in the ion trap, without significant leakage into the ion source. Calculations show that the conductance of a 1 mm ion orifice on the ion trap end-cap for helium gas at 295K is 0.245 $Ls^{-1}$. If the pressure in the trap is 0.1 mbar, the gas throughput is 0.0245 mbar L $s^{-1}$. The number-of-particles flow rate through the orifice into the source housing is therefore $dN/dt=6.023\times10^{17}$. Assuming a uniform pressure of 0.1 mbar inside the trap for about 10 ms, the total number of particles leaking from the trap would be about $6.023\times10^{15}$, and the partial pressure of the buffer gas in the ion source would be about $7.3\times10^{-5}$ mbar, with a free volume of 0.0033 $m^3$. These calculations indicate that if the trap is operated at a peak pressure of about 0.1 mbar and the duration of the pressure above 0.1 mbar is around 10 ms, the pressure increase in the source is not significant and would not lead to the drawbacks discussed above in respect of elevated source pressures. In contrast, if the trap were to be operated with a continuous elevated pressure of 0.1 mbar, the increase in the source pressure would be substantial and the disadvantages of an intermediates/AP source may be experienced.

Figure 7A:
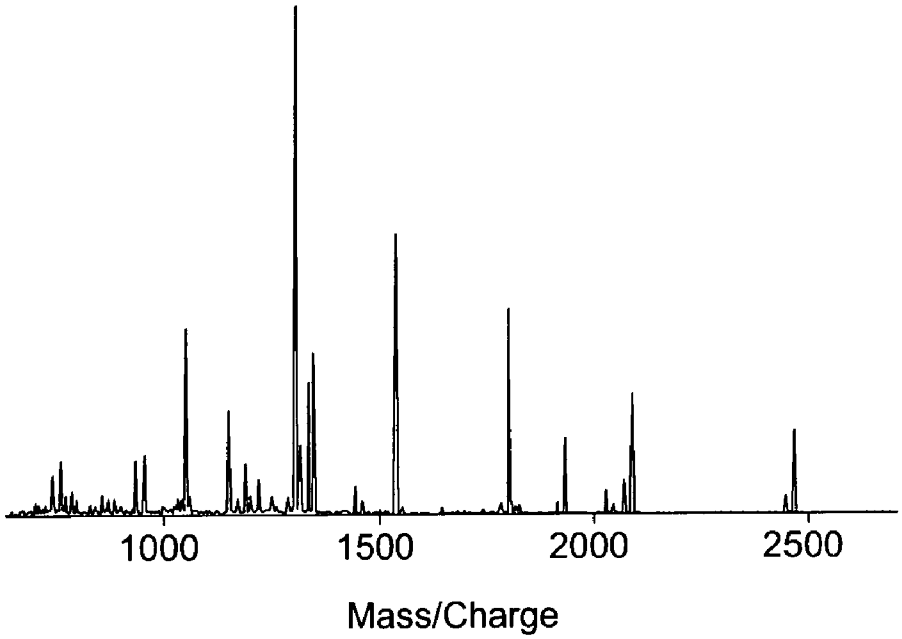
FIG. 7A shows the spectral lines indicative of extensive fragmentation of a mixture of 7 peptides injected into a MS wherein the ion trap has a pressure transient peaking at about $1.3\times10^{-3}$ mbar (1 mtorr)

FIG. 7A shows a spectrum of a peptide mixture using a cold matrix (DHB) i.e. matrix that produces low levels of uncontrolled fragments. The apparatus of FIG. 2 was used to obtain mass spectra when the ion trap was operated with a pulsed gas peak pressure below $1\times10^{-3}$ mbar (0.75 mtorr) and with a pulsed gas peak pressure greater than $1\times10^{-3}$ mbar (0.75 mtorr), to show the effect on uncontrolled fragmentation.

Figure 7B:
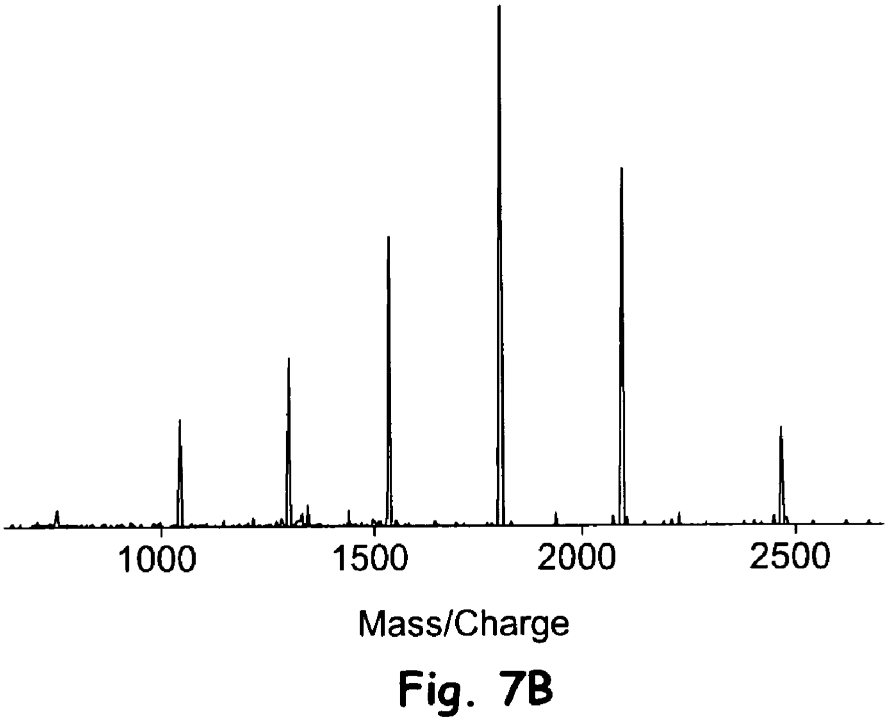
FIG. 7B shows the spectral lines indicative of minimal fragmentation of the same mixture as FIG. 7A, injected into an MS wherein the ion trap has a pressure transient peaking at about $2.6\times10^{-2}$ mbar (20 mTorr)

FIG. 7A shows the spectrum obtained when the peak pressure during pulsed gas introduction did not exceed $1\times10^{-3}$ mbar (0.75 mtorr). FIG. 7B shows the same peptide mixture demonstrating reduced uncontrolled fragmentation for pressure transients peaking at about $2.6\times10^{-2}$ mbar (20 mtorr) in the ion trap. The spectral lines correspond to bradykinin at m/z=757.39, angiotensin II at m/z=1046.54, angiotensin I at m/z=1296.68, PI 4R at m/z=1533.85, N-acetyl renin at m/z=1800.94, ACTH (I-17) at m/z=2093.08 and ACTH (18-39) at m/z=2465.19.

Figure 8:
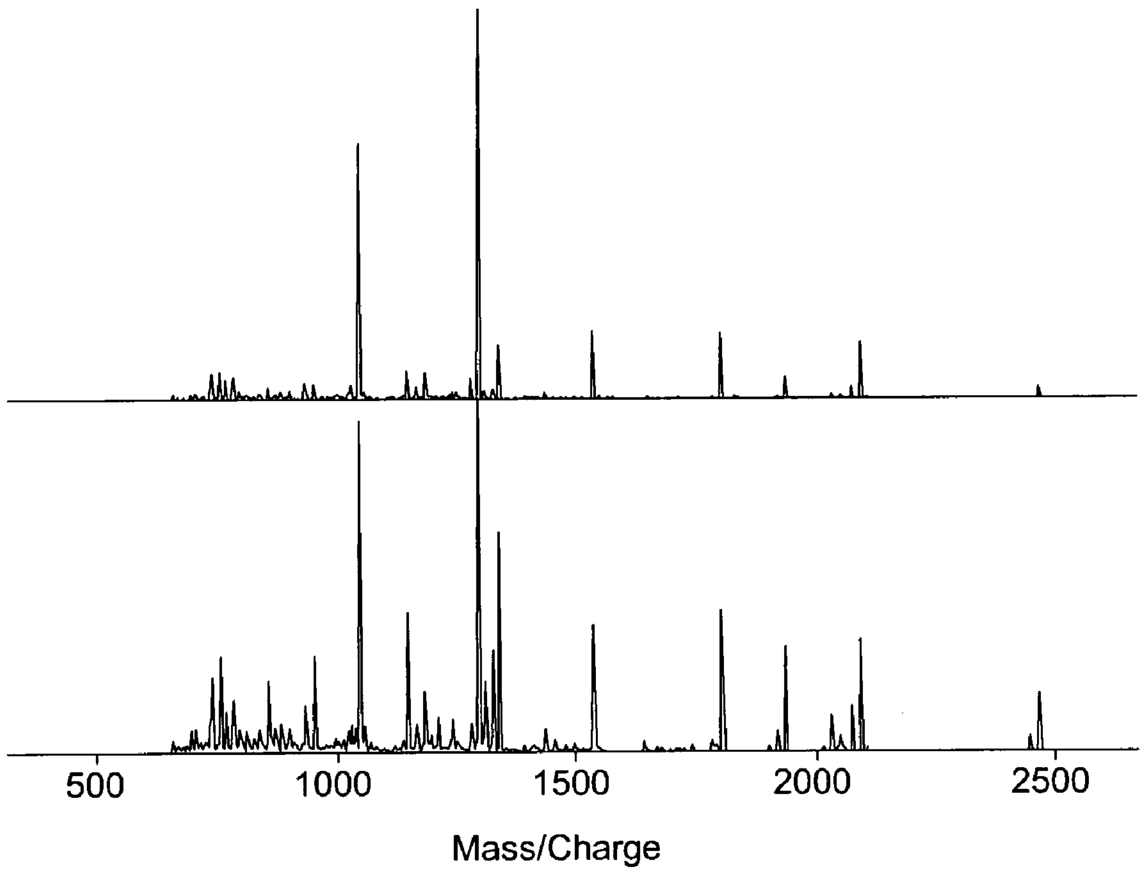
FIG. 8 shows the effect on the degree of fragmentation of injection time relative to the peak pressure in the ion trap, the upper spectrum being for ions arriving before the pressure peak and the lower spectrum being for ions arriving after the pressure peak.

FIG. 8 shows the effect of injecting ions before and after the peak of the pressure transient. The same peptide mixture as discussed above is used, this time with a hot matrix (CHCA) i.e. one that produces a high level of uncontrolled fragmentation. The upper spectrum is of ions arriving before the peak pressure, whereas the lower spectrum is of the same ions arriving about 10 ms after the peak pressure, when the pressure is about 25% of the peak pressure.

Figure 9:
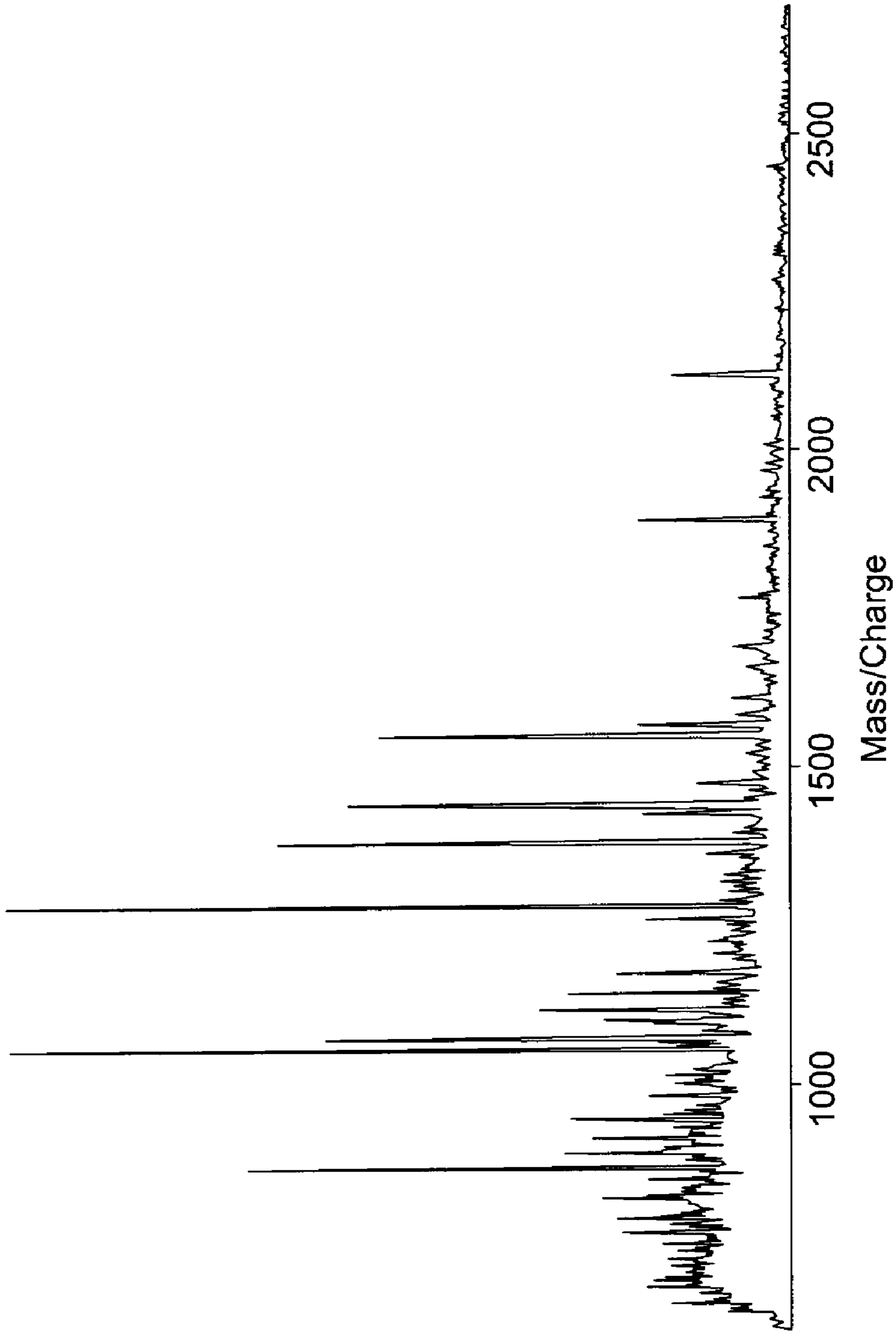
FIG. 9 shows spectral lines of 500 amol of phosphorylase glycogen tryptic digest as obtained with a method and apparatus of the present invention.

The MASCOT score of 500 amol phosphorylase glycogen tryptic digest load with CHCA on the target exceeds 180. The spectrum is shown in FIG. 9.

The effect of pulsing gases on the performance of the instrument is twofold. Firstly, the process of translational cooling can be completed within a narrow time window. Secondly, once thermalized collisions take place vibrational-to-translational energy transfer is promoted and internally excited ions formed under vacuum conditions can be stabilized. Translational and consequently vibrational cooling are both enhanced at the elevated pressure achieved by pulsing gas, in contrast to the traditional operation of ion traps employing static background pressure. In this way, internal energy of the ions can be rapidly reduced preserving intact ions therefore increasing the signal intensity. Kinetic energy damping of injected ions with large radial and axial excursions following the application of the RF trapping signal is also an important aspect of transient pressure operations within the ion trap. Both effects are more pronounced at pressures higher than those used in traditional operations with ion traps employing static background pressure environments.

These preferred embodiments have been described by way of example and it will be apparent to those skilled in the art that many alterations can be made that are still within the scope of the invention.

The invention claimed is:

1. A method of thermalizing ions in a mass spectrometer, said mass spectrometer having an ion source, an ion trap and a detector region, wherein said method includes the steps of:

producing ions in the ion source whilst maintaining the pressure in the ion source below about $10^{-4}$ mbar;

pulsing gas into the ion trap to achieve a peak pressure of more than $10^{-3}$ mbar and externally injecting ions from the ion source into the ion trap; and ejecting ions from the ion trap into the detector region whilst maintaining the pressure in the detector region below about $10^{-4}$ mbar.

2. A method according to claim 1, wherein the pressure within the ion trap reduces to 25% of the peak pressure within about 40 ms from the initiation of the gas pulse.

3. A method according to claim 1, wherein the pulse of gas produces a pressure of more than $10^{-3}$ mbar in the ion trap for no more than 40 ms.

4. A method according to claim 1, wherein the width of the gas pulse at 25% of the peak pressure is no more than 30 ms.

5. A method according to claim 1, wherein the time taken to reach peak pressure is less than 5 ms after initiation of the gas pulse.

6. A method according to claim 1, wherein the pressure outside the ion trap remains below about $10^{-4}$ mbar during the period of elevated pressure within the ion trap.

7. A method according to claim 1, wherein the method includes trapping the ions in the ion trap.

8. A method according to claim 1, wherein the pressure in the ion trap is reduced to below $10^{-4}$ mbar after thermalization of the ions.

9. A method according to claim 1, wherein the ion trap is located in a differentially pumped ion trap enclosure, which trap enclosure includes a gas inlet port through which gas is delivered to the ion trap from a gas inlet system, a gas outlet port through which gas is removed from the ion trap by operation of a vacuum system and an ion orifice through which ions can enter the ion trap, wherein the trap enclosure includes entrance and exit ion orifices, and the step of injecting ions into the ion trap includes injecting ions through the entrance ion orifice, wherein the method includes the step of ejecting ions from the ion trap through the exit ion orifice, and wherein the gas outlet port is connected to a vacuum system and a vacuum is applied to the ion trap during thermalization of the ions, and wherein the vacuum system includes a vacuum device that provides a vacuum pumping speed in the range 10 to 100 $Ls^{-1}$.

10. A method according to claim 9, wherein the gas inlet port is connected to a gas inlet system that includes a gas inlet valve, wherein the duration of opening of the gas inlet valve is controlled so as to obtain the desired pressure profile in the ion trap.

11. A method according to claim 9, wherein the gas inlet system includes a gas source that provides a pressure to the gas inlet valve in the range 0.1 to 10 bar.

12. A method according to claim 1, wherein the method includes providing a plurality of pulses of gas to the ion trap to thermalize ions in the ion trap.

13. A method according to claim 1, wherein the method includes the step of pulsing a second gas into the ion trap after the ions have been thermalized, as part of an ion dissociation experiment.

14. A method according to claim 1, wherein the method includes the step of supplying a background gas to the ion trap continuously throughout the injection and thermalization of the ions.

15. A method according to claim 1, wherein the method includes the step of coordinating the production of ions and the thermalization gas pulse so that ions enter the ion trap when the pressure within the ion trap is greater than $10^{-3}$ mbar, wherein the ions enter the ion trap when the pressure within the ion trap is at least 80% of the peak pressure.

16. A method according to claim 1, wherein the ions enter the ion trap when the pressure within the ion trap is increasing.

17. A method according to claim 1, wherein the ions enter the ion trap when the pressure within the ion trap is substantially at the peak pressure.

18. A method according to claim 1, wherein the mass spectrometer is a MALDI QIT MS or a MALDI QIT TOF MS.

19. A method of thermalizing ions in an ion trap, said method including the steps of;

pulsing gas into the ion trap and pumping gas from the ion trap to achieve a peak pressure of more than $10^{-3}$ mbar; and injecting ions into the ion trap; wherein the pressure in the ion trap returns to about 25% of the peak pressure within about 40 ms from the initiation of the gas pulse.

20. A method of thermalizing ions in an ion trap, said method including the steps of;

pulsing gas into the ion trap and pumping gas from the ion trap to achieve a peak pressure of more than $10^{-3}$ mbar; and injecting ions into the ion trap; wherein the width of the gas pulse at 25% of the peak pressure is no more than 30 ms.

21. A method of configuring a mass spectrometer having an ion source, an ion trap and a detector region, wherein said method includes the step of selecting the duration of a gas pulse to be injected into the ion trap so that in use the pressure within the ion trap temporarily exceeds $10^{-3}$ mbar, whilst maintaining a pressure of less than about $10^{-4}$ mbarin the ion source and detector region.

22. Apparatus for thermalizing ions in a mass spectrometer, said mass spectrometer having an ion source, an ion trap and a detector region, wherein said apparatus includes ion trap pressure control means that in use generates a pressure in the ion trap that is greater than $10^{-3}$ mbar by pulsing gas into the ion trap so that ions entering the trap experience a pressure of greater than $10^{-3}$ mbar, whilst maintaining a pressure of less than about $10^{-4}$ mbar in the ion source and detector region.

23. Apparatus according to claim 22, wherein the ion trap pressure control means include a trap enclosure within which the ion trap is locatable, wherein the trap enclosure includes a gas inlet port, a gas outlet port and at least one ion orifice through which ions can enter the ion trap, wherein the diameter of the ion orifice is in the range 0.5 to 3 mm.

24. Apparatus according to claim 23, wherein the trap enclosure includes an exit ion orifice through which ions exit the ion trap to the detector region, wherein the exit ion orifice has a diameter in the range 0.5 to 3mm.

25. Apparatus according to claim 23, wherein the cross-sectional area of the gas outlet port is at least 5 $cm^2$.

26. Apparatus according to claim 23, wherein the gas outlet port is connected to a vacuum conduit that connects the gas outlet port to a vacuum device, wherein the vacuum device provides a pumping speed of 10 to 100 $Ls^{-1}$.

27. Apparatus according to claim 23, wherein the gas inlet port is connected to a gas inlet conduit associated with a gas inlet valve which gas inlet conduit connects the gas inlet port to a gas inlet system, wherein the gas inlet valve is operable to control the flow of gas from the gas inlet system to the ion trap so that the peak pressure in the ion trap exceeds $10^{-3}$ mbar and the pressure in the ion source and detector regions does not exceed $10^{-4}$ mbar, and wherein the diameter of the valve orifice on the front face of the gas inlet valve has a diameter in the range 5 to 300 μm.

28. Apparatus according to claim 22, wherein the ion trap pressure control means includes a pulse controller for controlling the duration of the gas pulse so that the peak pressure in the ion trap exceeds $10^{-3}$ mbar and the pressure in the ion source and detector regions does not exceed $10^{-4}$ mbar.

29. Apparatus according to claim 22, wherein the ion trap pressure control means includes synchronizing means for synchronizing ion production and the gas pulse so that ions enter the ion trap when the pressure within the ion trap is more than $10^{-3}$ mbar.

30. A mass spectrometer having the apparatus according to claim 22.

31. A mass spectrometer according to claim 30, wherein the mass spectrometer is a MALDI QIT MS or a MALDI QIT TOF MS.

32. A method of modifying a mass spectrometer having an ion source, an ion trap and a detector region, the method including the step of: installing ion trap pressure control means according to claim 22.

33. A method of thermalizing ions in a mass spectrometer, said mass spectrometer having an ion source, an ion trap and a detector region, wherein said method includes the steps of:

producing ions in the ion source whilst maintaining the pressure in the ion source below about $10^{-4}$ mbar;

pulsing gas into the ion trap to achieve a peak pressure of more than $5 \times 10^{-3}$ mbar and externally injecting ions from the ion source into the ion trap; and ejecting ions from the ion trap into the detector region whilst maintaining the pressure in the detector region below about $10^{-4}$ mbar.

34. A method according to claim 33, wherein the peak pressure of the gas in the ion trap is more than $10^{-2}$ mbar.

35. Apparatus for thermalizing ions in a mass spectrometer, said mass spectrometer having an ion source, an ion trap and a detector region, wherein said apparatus includes ion trap pressure control means that in use generates a pressure in the ion trap that is greater than $5 \times 10^{-3}$ mbar by pulsing gas into the ion trap so that ions entering the trap experience a pressure of greater than $10^{-3}$ mbar, whilst maintaining a pressure of less than about $10^{-4}$ mbar in the ion source and detector region.

36. Apparatus according to claim 35, wherein the pressure of the gas in the ion trap is more than $10^{-2}$ mbar.

* * * * *